United States Patent [19]

Meehan

[11] 4,387,746
[45] Jun. 14, 1983

[54] WIRE SEPARATION TOOL AND METHOD OF PREPARING MULTICONDUCTOR CABLE

[75] Inventor: James E. Meehan, Levittown, N.Y.

[73] Assignee: Slater Electric Inc., Glen Cove, N.Y.

[21] Appl. No.: 130,223

[22] Filed: Mar. 14, 1980

[51] Int. Cl.³ .......................... B21F 1/00; B26B 17/00
[52] U.S. Cl. ...................................... 140/105; 30/90.8; 30/90.4; 29/745; 29/758; 29/866; 81/9.5 A; 81/9.51
[58] Field of Search .................. 140/147, 105; 83/694, 83/618, 925 R, 466.1, 459, 460; 81/9.51, 9.5 A; 29/872, 745, 868, 758, 866, 751; 269/254 CS, 87, 87.1, 311, 87.2, 317; 30/90.4, 90.8, 91.1, 293, 182; 227/149, 152, 154

[56] References Cited

U.S. PATENT DOCUMENTS

| | | |
|---|---|---|
| 435,414 | 9/1890 | Fisher . |
| 1,383,145 | 6/1921 | Penner et al. ........................ 227/149 |
| 1,452,634 | 4/1923 | Bell . |
| 2,320,400 | 6/1943 | Bedell . |
| 3,174,723 | 3/1965 | McGuire . |
| 3,177,741 | 4/1965 | DeBruin . |
| 3,191,464 | 6/1965 | Demler . |
| 3,221,576 | 12/1965 | Goetz . |
| 3,226,815 | 1/1966 | Kelly . |
| 3,279,058 | 10/1966 | Dibble ................................ 30/90.8 |
| 3,406,558 | 10/1968 | Tillmann et al. . |
| 3,425,114 | 2/1969 | Fellenzer, Jr. . |
| 3,494,171 | 2/1970 | Rapp . |
| 3,571,888 | 3/1971 | Di Filippo . |
| 3,596,541 | 8/1971 | Bieganski . |
| 3,611,782 | 10/1971 | Eppler . |
| 3,710,610 | 1/1973 | McCaughey . |
| 3,732,718 | 5/1973 | Barberio et al. . |
| 3,837,211 | 9/1974 | Gress et al. . |
| 3,846,894 | 11/1974 | Parsons et al. ................... 29/868 X |
| 3,860,739 | 1/1975 | Kloth et al. . |
| 3,903,725 | 9/1975 | Rommel . |
| 3,906,561 | 9/1975 | Bawa . |
| 3,908,235 | 9/1975 | Telliard et al. . |
| 3,935,637 | 2/1976 | Bunnell ................................ 29/866 |
| 3,966,152 | 6/1976 | Bremberg . |
| 4,019,647 | 4/1977 | Arnold . |
| 4,025,998 | 5/1977 | Eppler .............................. 29/745 X |
| 4,265,016 | 5/1981 | Ducret ................................ 30/90.8 |

FOREIGN PATENT DOCUMENTS

| | | | |
|---|---|---|---|
| 1294093 | 10/1972 | United Kingdom . | |
| 1402853 | 8/1975 | United Kingdom ................. 30/182 |

Primary Examiner—Lowell A. Larson
Assistant Examiner—Carl J. Arbes
Attorney, Agent, or Firm—Morgan, Finnegan, Pine, Foley & Lee

[57] ABSTRACT

A separation tool has a multiple-sectioned cable-advance assembly which locates an electrical cable relative to cutting blades on an anvil assembly, portions of the advance assembly being displaced laterally to follow the positions of the cable wires during their separation. Cutters having multiple staggered edges of varying orientation relative to the cutting direction pierce the outer insulation of the cable and separate the cable wires as the cable is advanced onto the cutter blades. A uniform force is to be exerted throughout a cutting stroke by an operator of the tool. Spring loaded rods push the wires away from the cutters to free the wires at the conclusion of the separation operation.

22 Claims, 13 Drawing Figures

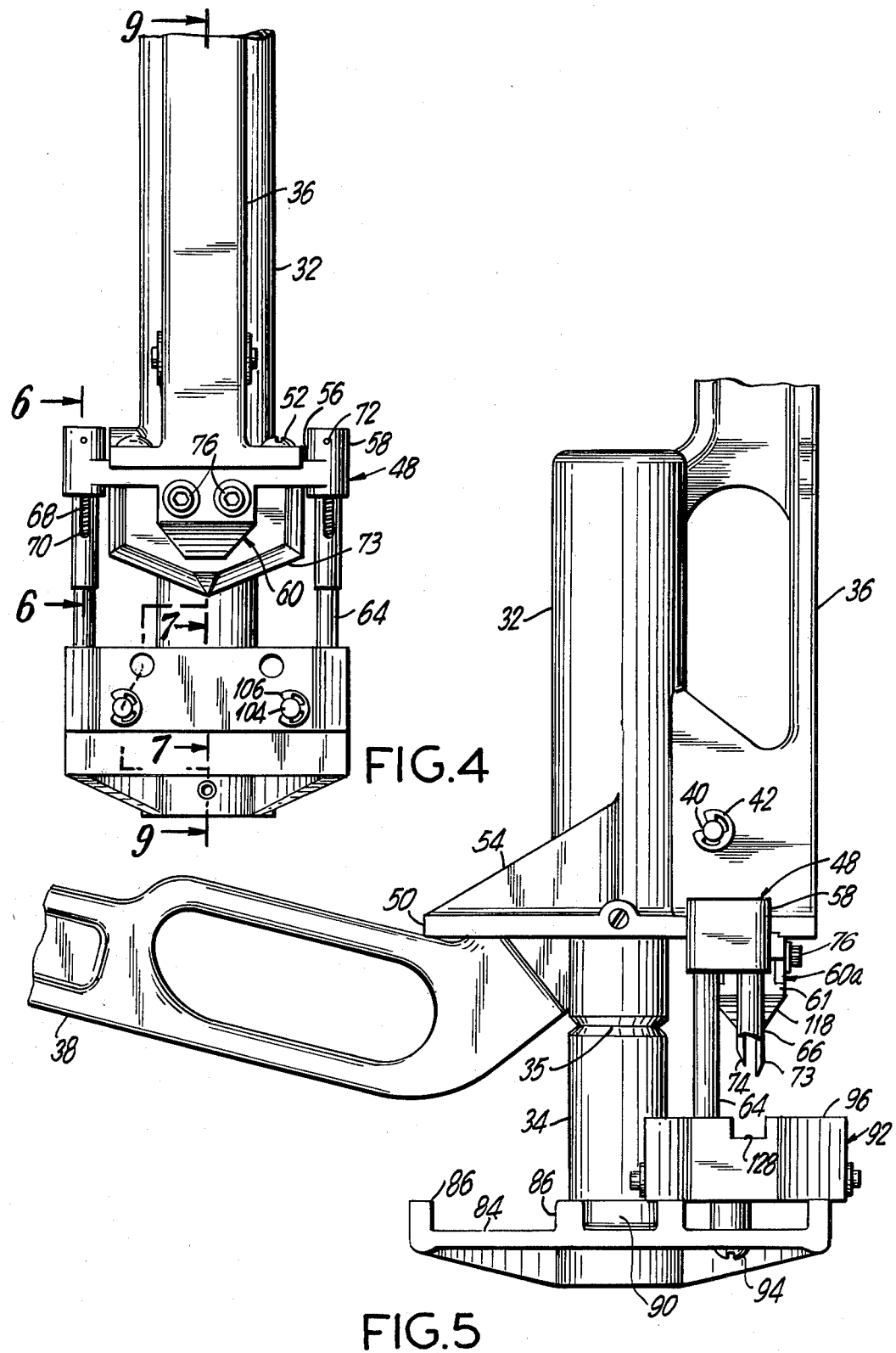

WIRE SEPARATION TOOL AND METHOD OF PREPARING MULTICONDUCTOR CABLE

BACKGROUND OF THE INVENTION

This invention relates to a tool for separating the conductors of an electrical cable and, more particularly, to such a tool have staggered cutting blades and an element for ejecting the separated cable members.

Electrical cable composed of three conducting elements, enclosed within insulating material, is often utilized in the wiring of buildings and similar structures for providing power for lighting, heating, and other purposes. Access to the electric power carried by such cables is had through sockets (receptacles) and switches being customarily installed in the walls of the buildings. Sockets and switches which make electrical contact with the individual conductors of the cable are now commercially available as self-contained devices. Once the three wires of the cable have been separated, such self-contained sockets and switches can be rapidly attached to the cable, thereby reducing the time required for installation of electric wiring as compared with the time for terminating the usual wiring devices.

A problem arises in that a contributing factor in the installation time of the electric wiring is the time spent in preparing the cable for the sockets and switches. The preparation involves the separation of the wires without damaging either the electrical insulation around the line conductor wires (for wiring receptacles) or any of the conductor wires themselves.

Tools have been developed to facilitate the process of separating the wires, but generally have not had as facile an operation as might be desired. For example, a non-uniform operating force is required during the cutting stroke, and, after the cutting stroke, the wires need be extracted manually from sharp blades of the tools. The lack of uniform exertion in the use of such tools, as well as the danger of personal injury attendant the manual manipulation of wire adjacent the sharp edges, necessitates a careful and time consuming usage of the tool, and also discourages the use of such tools.

One such tool, described in U.S. Pat. No. 3,846,894, has multiple parts which are pivotally connected at several places. Although the tool can function for its intended purpose, its cutting blades are dangerously exposed and it is cumbersome to handle and awkward to operate because the various parts tend to "flop" about. In addition, during operation of this tool, the operator experiences a continuous and substantial resistence to cutting so he must increase the force he exerts as he completes the slicing operation.

Another such tool is disclosed in U.S. Pat. No. 4,025,998. Although this tool functions adequately, it is adapted to spread the cable conductors, after the slicing operation, in two planes, thereby making it awkward to couple to a wiring device. In addition, when operating the tool, the force which must be exerted is not uniform over the entire cutting stroke and, in fact, requires a relatively large exertion at at least the end of the cutting stroke.

An alternative procedure, utilized long before the advent of such tools, is to separate the wires manually with the aid of a knife. Such a procedure is hazardous to the electrical cable in that insulation covering the individual wires, or the wires themselves, may be inadvertently cut, and the procedure is hazardous to persons performing the wire separation in that a knife may slip, particularly in a cold environment wherein the person may be wearing gloves. In spite of the long felt need for a tool to adequately simplify the wire separation procedure, it appears that heretofore, no such tool has been available.

SUMMARY OF THE INVENTION

The foregoing problems are overcome and other advantages are provided by a wire separation tool which, in accordance with the invention, incorporates an anvil assembly having a plurality of cutter blades which, preferably, have staggered cutting edges of varying orientation relative to the cutting direction and a cable-advance assembly adapted to locate a multi-conductor electrical cable relative to the blades and to advance the cable against the blades. The advance assembly is driven in a fixed direction along guide means by a lever to move the cable into the cutting blades for slicing the cable and, thereafter, separating the conductor wires of the cable, all under a generally uniform force or exertion by an operator of the tool during the cutting stroke. Portions of the advance assembly displace laterally to follow the outward movement of the individual wires during the separation operation, thereby supporting the conductors during the separation step. Spring loaded arms (or ejector pins) are mounted adjacent the cutters and directed towards the cable-advance assembly to urge the wires away from the cutters after the separation step is completed. The cable advance and anvil assemblies also include flange portions which serve as the jaws of a vise for effecting closure of an electrical wiring device when an electrical cable is to be connected thereto.

BRIEF DESCRIPTION OF THE DRAWINGS

The aforementioned features and other aspects of the invention are explained in the following description taken in connection with the accompanying drawings wherein:

FIG. 4 is an end view, similar to that of FIG. 3, of a portion of the tool of FIG. 1, in the open configuration;

FIG. 5 is a side elevation view, similar to that of FIG. 2, of a portion of the tool of FIG. 1, in the open configuration;

DESCRIPTION OF THE PREFERRED EMBODIMENT

Figure 1:
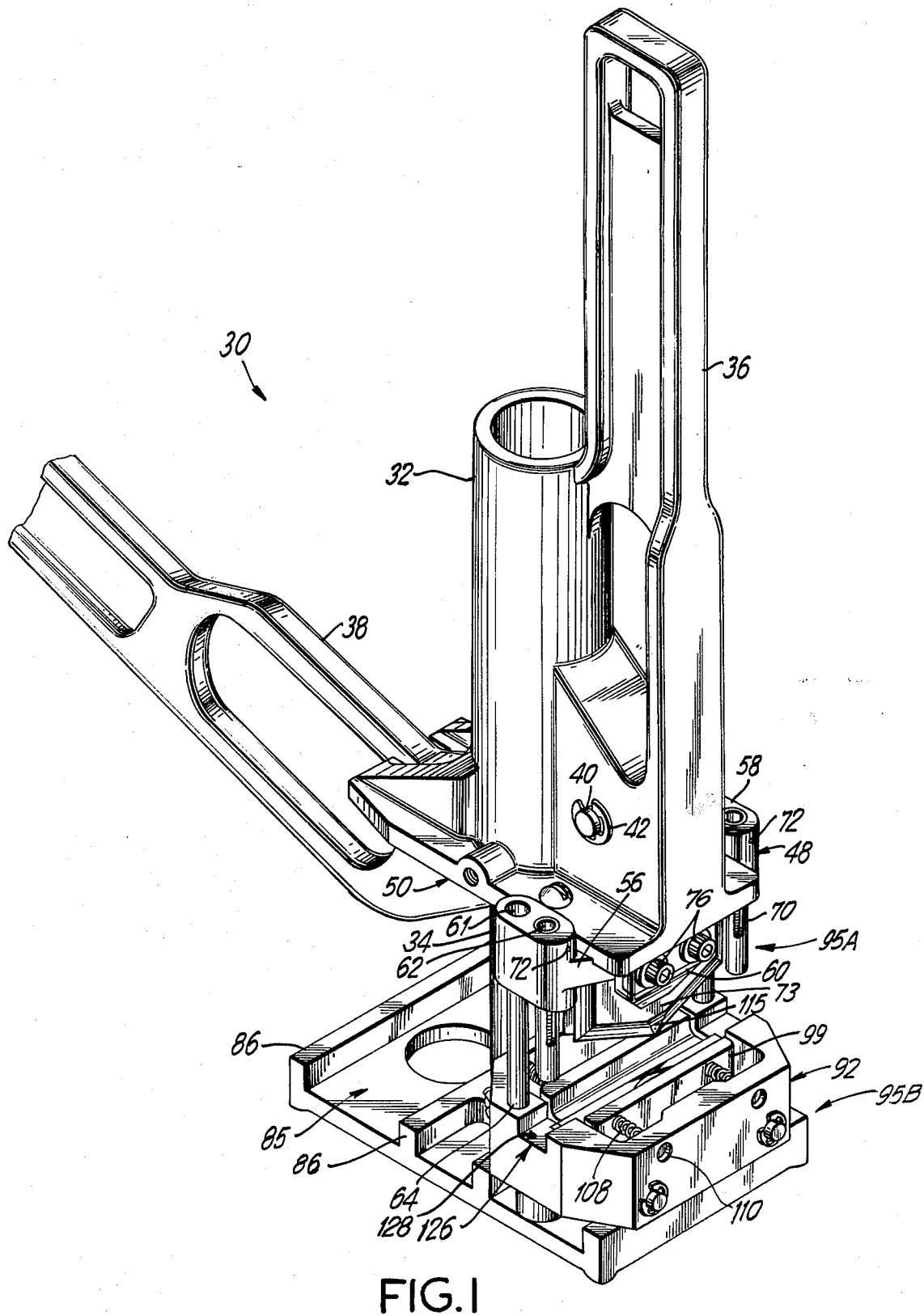
FIG. 1 is a pictorial view of the wire separation tool of the invention in the open configuration, with the anvil cutter blades facing downwardly.

Referring now to the FIGURES, the wire separation tool 30, comprises, in accordance with the invention, a cylinder 32 having another cylinder 34 slidably mounted therein, and a handle 36 extending from the cylinder 32 in the axial direction thereof. A lever 38 (FIG. 2) is pivotally connected to the base of the handle 36 by a pin 40 secured to the handle by lock washers (or "snap rings") 42. The piston 34 includes a bearing 44 (including a ring preferably made of a hard material such as mild steel rotatable over a hardened steel pin secured to cylinder 34) which contacts the lever 38 by slot 46 formed in the lever 38 to provide a variable fulcrum about bearing 44. Thereby, upon a pivoting of the lever 38 about the pin 40, the lever 38 urges the cylinder 34, via bearing 44, to translate within the cylinder 32 in piston-like fashion. By virtue of the slot and bearing arrangement 46/44, the rotational movement of lever 38 imparts a translational movement of cylinder 34 within cylinder 32.

As the slot 46 translates over bearing 44 during the pivoting, force exerted upon cylinder 34 by a turning moment of the lever 38 relative to the handle 36 varies with the displacement of the piston 34 relative to the cylinder 32. The force required for cutting through the cable thus tends to be uniform over the entire cutting stroke because the maximum mechanical advantage is reached at the middle of the stroke when the resistance to cutting (caused by the paper surrounding the ground conductor) is the greatest.

The tool 30 further comprises an anvil assembly 48 (best seen in FIGS. 8 and 11) fixed, by screws 52, to flange 50 which is preferably formed integrally with handle 36 and cylinder 32 so as to hold the cutter blades stationary relative to handle 36. Flange 50 is stabilized relative to cylinder 32 by gussets 54 extending between opposite sides of the flange 50 and cylinder 32 for strength in the closing of a wiring device, as will be described below. The anvil assembly 48 comprises a crossbar 56 having a pair of upstanding wings 58 at opposite ends thereof, and a pair of depending legs 60 at the midsection of the bar 56. The wings 58 have a pair of vertically disposed cylindrical bores 61-62 (FIG. 1), the bore 61 being toward the back of the wing 58, closer to the lever 38, while the bore 62 is towards the front of the wing 58, away from the lever 38.

Each bore 61 slidably receives a guide pin 64 which is mounted to the cable-advance assembly and slidably translates therein. Each bore 62 holds a push-rod (or ejector pin) 66 which is slidably translatable therein and includes a spring 68 disposed within a central chamber 70 of the rod 66 for urging the rod 66 downwardly towards the anvil member. One end of spring 68 exerts a force against a pin 72 which is disposed within the wing 58 and is received within slot 67 of push-rod 66, while the other end of the spring abuts the closed end of rod 66.

A pair of cutters 73-74 (FIG. 8) are secured by bolts 76 to the tapered support members 60 and are directed towards the cable-advance assembly. The cutters 73-74 are separated from each other by a spacer plate 78, to provide a slot to receive the center (or ground) conductor of cable during the slicing operation.

The opposed inner walls of the cutters 73-74, contiguous to the spacer plate 78, have flat surfaces which terminate in the cutting edges 111-112. The exterior surfaces of the cutters 73-74 have chamfers 115-116 respectively, which also terminate in the cutting edges 111-112.

Figure 8:
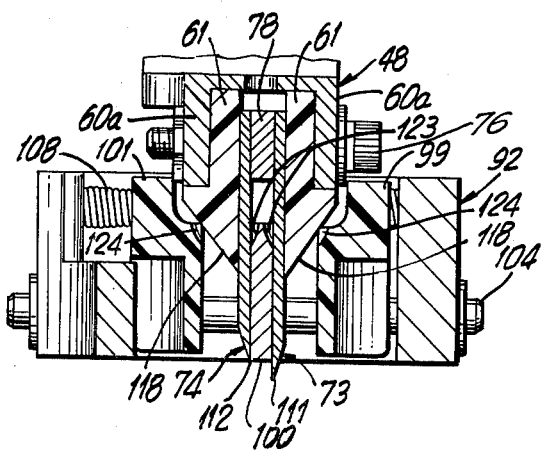
FIG. 8 is a sectional view of the engaged cutter blades and cable-advance assembly taken along line 8—8 in FIG. 3.
Figure 11:
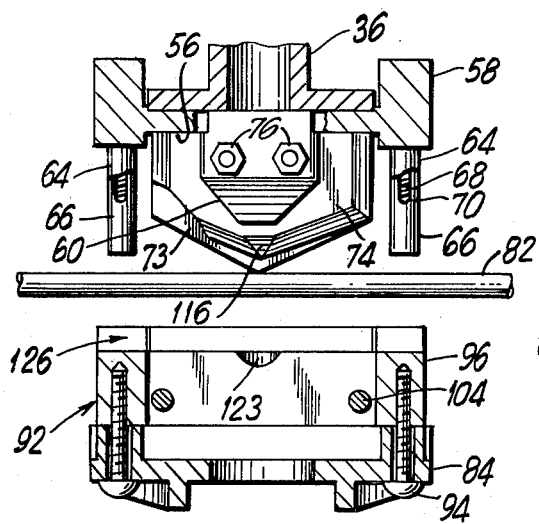
FIG. 11 is a sectional view taken along line 11—11 in FIG. 9.

As indicated in FIGS. 4 and 11, tapered support members 60 may comprise a pair of unitary tapered structures which are formed integrally with crossbar 56 and wing members 58. However, as will be more apparent hereinafter, it is preferred that the cutter blade supports include an insert made of a plastic (such as an acetal sold by E. I. du Pont under the designation "DELRIN") which will provide a relatively slippery surface along tapered surface 118. Thus, as shown in FIG. 8, support projections 60a may be formed integrally with crossbar 56 but tapered plastic inserts 61 are located within the slot (unnumbered) between support portions 60a and secured in place by fasteners 76 which extend through openings formed in portions 60a, inserts 61, blades 73-74 and spacer 78 to clamp these structures tightly together. It will be understood that integral support members 60 will have the same configuration as projections 60a and inserts 61, together.

Figure 2:
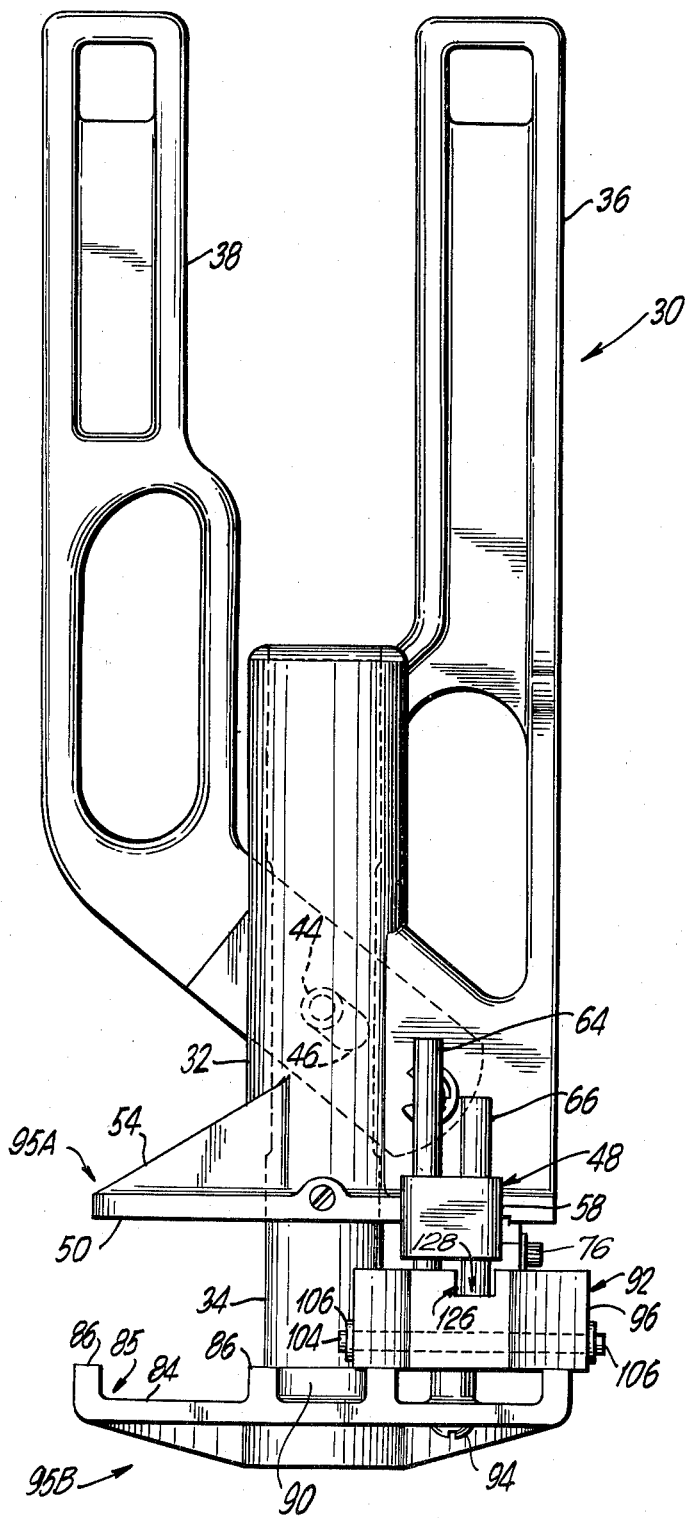
FIG. 2 is a side elevation view of the tool shown in FIG. 1 in the closed configuration.
Figure 3:
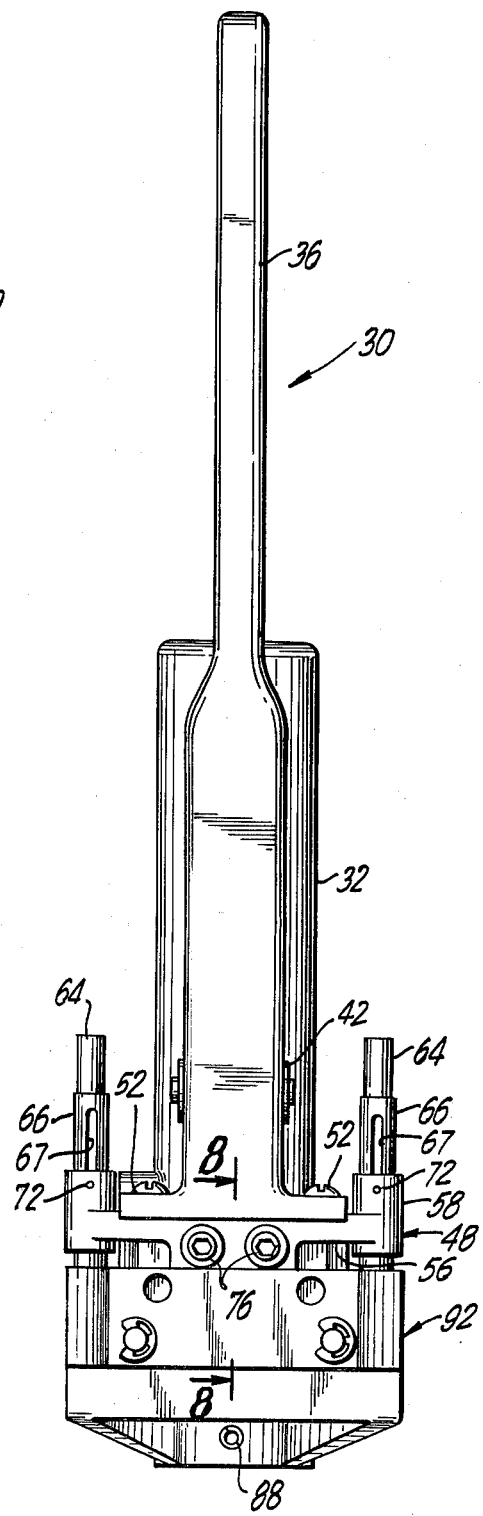
FIG. 3 is an end elevation view of the tool shown in FIG. 1 also in the closed configuration.
Figure 6:
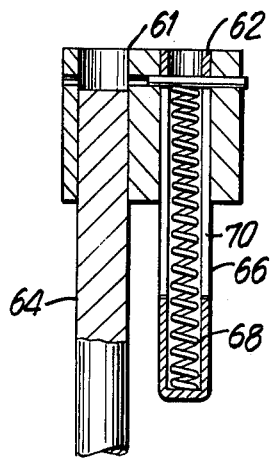
FIG. 6 is a sectional view of a portion of the tool of FIG. 1, taken along line 6—6 in FIG. 4.
Figure 9:
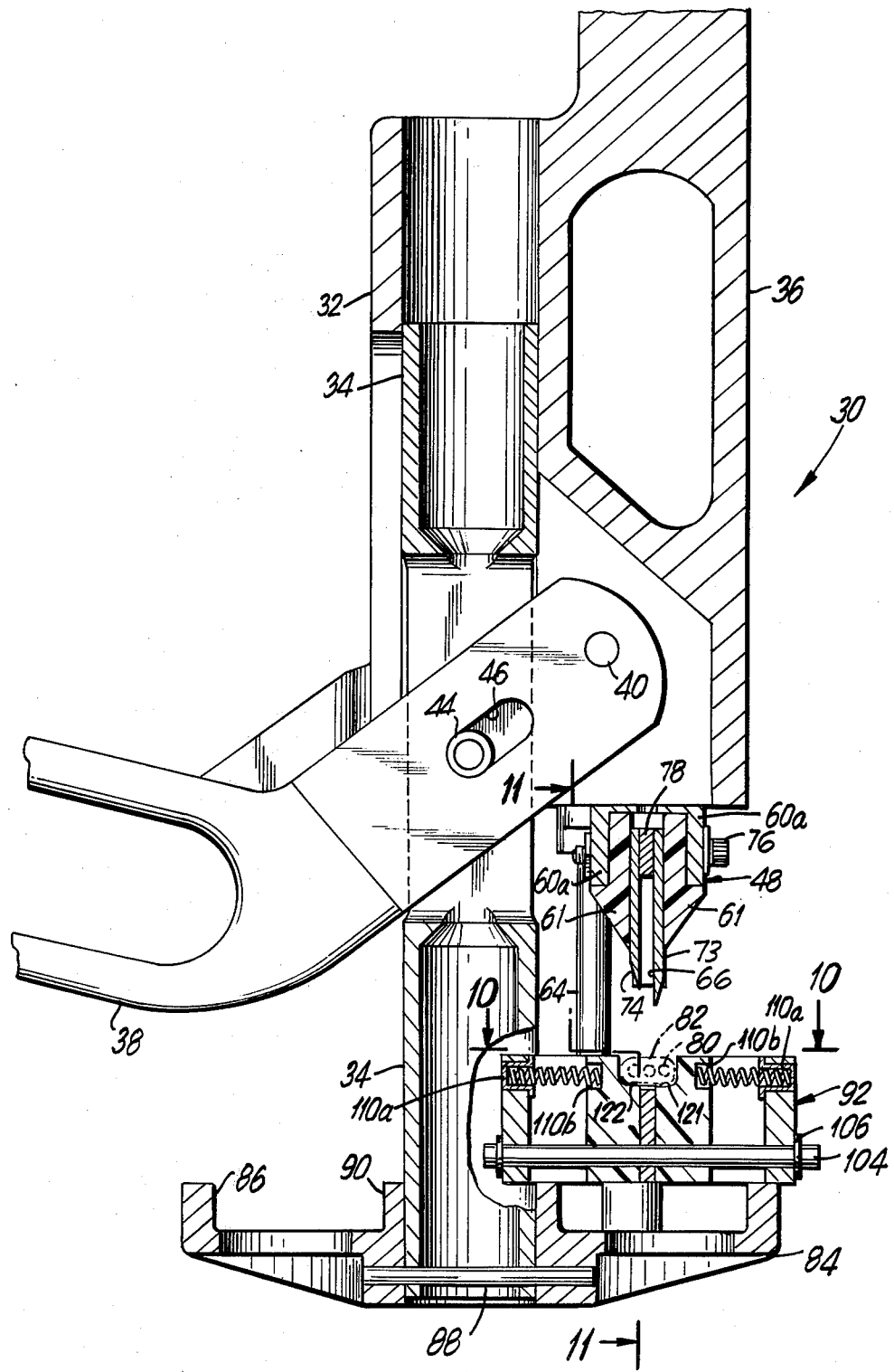
FIG. 9 is a sectional view of the tool of FIG. 1, taken along line 9—9 in FIG. 4 to show a lever mechanism for moving the cable-advance assembly into the anvil (cutter blade) assembly.

As shown in FIGS. 1, 2 and 9, a plate 84 having ribs 86 thereon (which define a broad slot 85) is secured to the bottom end of the piston 34, opposite the handle 36, by means of a pin 88 (FIGS. 3 and 9) passing through a collar 90 of the plate 84 and through the end of the piston 34. The plate 84 is thus displaced relative to the flange 50 in accordance with the displacement of the piston 34 relative to the cylinder 32 as was described hereinabove.

Figure 12:
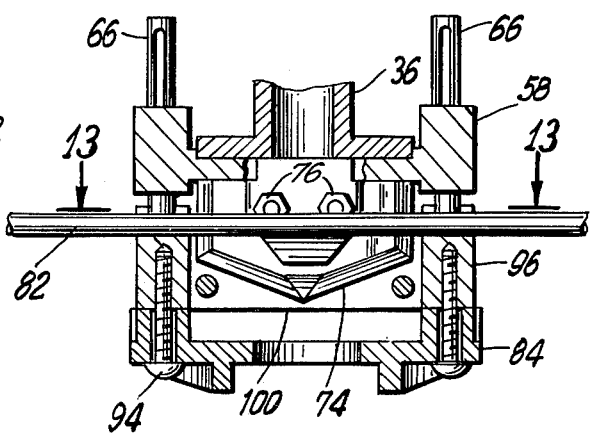
FIG. 12 is a view similar to that of FIG. 11 after completion of the cable slicing and separation operation.
Figure 13:
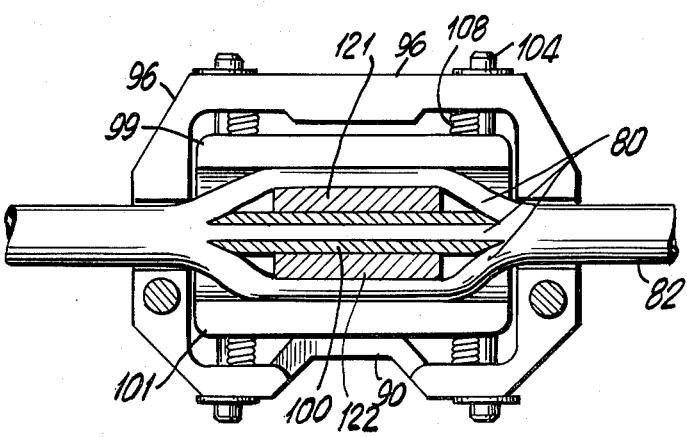
FIG. 13 is a sectional view taken along line 13—13 in FIG. 12 showing the cable conductors after the slicing and separating operation.

A cable-advance assembly (indicated generally at 92) is attached by screws 94 to the plate 84. Assembly 92 is adapted both to locate the cable 82 (FIG. 9) relative to the cutters 73-74 and to advance the cable toward the cutters 73-74 (FIGS. 11-13) upon relative displacement of cylinders 32 and 34 in response to the rotation of lever 38 towards the handle 36.

The cable-advance assembly 92 comprises a frame 96 (preferably a unitary structure), a separator plate 100 held within slots 97 formed in the frame (the separator member being the same thickness as spacer 78 and positioned to correspond to the location of spacer 78 when the advance assembly is actuated), and a pair of slidable blocks 99 and 101. Slidable blocks 99 and 101 are slidably supported on a pair of guide pins 104 (preferably made of a hardened material such as drill rod) which are secured to the frame 96 by lock washers (or "snap rings") 106 and which also pass through plate 100.

Blocks 99 and 101 are biased against separator plate 100 by springs 108 which are each secured at one end within a blind eyelet 110a formed in frame 96 and counterbore 110b formed in each block. Two springs 108 are attached to the block 99 for urging the block 99 toward the separator 100 and, similarly, two springs 108 are attached to the block 101 for urging the block 101 toward the separator 100. The blocks 99 and 101 are also provided with support shelves 121-122 which, together with the top surface of the separator plate 100, support one of the three conductor wires 80 of the cable 82 during separation.

Upon a closing of handle 38 toward handle 36, cable-advance assembly 92 moves towards the anvil assembly 48. The tips of the blades penetrate the spaces between the plate 100 and the two blocks 99 and 101. As assembly 92 continues moving into the cutting assembly, the tips of tapered inserts 61 (or support members 60) penetrate the block/separator interfaces to permit completion of the cutting stroke, as illustrated in FIG. 8, and force the blocks 99 and 101 laterally away from each other.

It will be understood that chamfers 115-116 on blades 73-74 facilitate the formation of the leading cutting edges as well as penetration into the block/separator interfaces. To this end, concave "finger-tip" notches 123 may be formed on separator panel 100 and similar notches 124 may be formed on blocks 99 and 101 to facilitate penetration of the block/separator interfaces.

Figure 7:
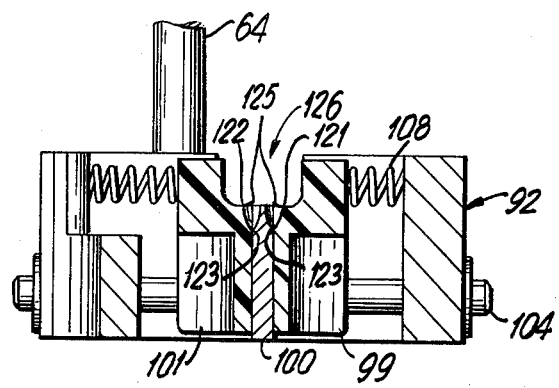
FIG. 7 is a sectional view of the cable-advance carriage of the tool of FIG. 1, taken along line 7—7 in FIG. 4.
Figure 10:
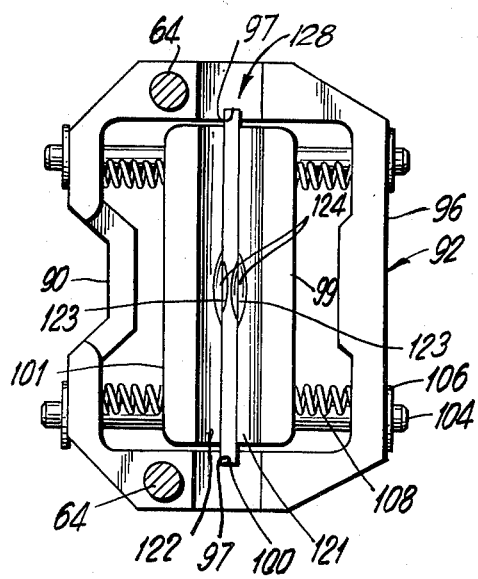
FIG. 10 is a plan view of the cable-advance carriage taken along line 10—10 in FIG. 7.

As shown in FIG. 7, each shelf 121-122 may be formed with a slight concavity to form a corner-edge 125 adjacent the separator plate 100 of slightly less than 90°. This configuration is preferred when unitary supports 60 are integrally formed on crossbar 56 to ensure that the outer two cable conductors are directed outwardly away from plate 100 by corner-edges 125 during the cutting operation so that, after slicing, the conductors will be laterally separated rather than forced into the spaces between the blocks and separator because of any tendancy of the cable insulation to bind to surfaces 118. Where plastic inserts are used, such corner-edges 125 are unnecessary since the material is generally slippery enough to avoid any such binding tendency.

In operation, therefore, the cable 82 is simply laid in channel 126 of cable-advance assembly 92, the channel being formed by notches 128 in the frame 96, the shelves 121-122 of blocks 99 and 101 and the top surface of plate 100. The cable 82 is laid flat in the channel 126 with the wires 80 laying side by side. With handle 36 held in one of the operator's hands, lever 38 is then pivoted towards the handle 36 to close flanges 50/84. As the flanges close, the cable is advanced onto cutter blades 73-74 which, thereby, pierce the insulation jacket on the cable 82. As the cable advances, the blades penetrate between the wires 80 thereby separating the wires. When assembly 92 is advanced further, the two outer wires 80 (which are now seated, one each, on shelves 121 and 122 of blocks 99 and 101) continue to be separated from the central (or ground) conductor (which is supported on the top surface of plate 100 within the inter-blade space) by the tapered support members. During this separation operation, the tapered supports force blocks 99 and 101 apart with the cable conductors supported thereon.

The cutting edge 111 of the front cutter 73 advantageously extends slightly closer to assembly 92 than does the cutting edge of the rear cutter 74. During advancement of the cable 82, the initial stage of the cable piercing is accomplished sequentially by the cutters 73-74 with the cutter 73 piercing the cable slightly ahead of cutter 74. Thereby, there is a staggering of the times of occurrence of the initial cutting forces so that a person operating the tool 30 will exert a more uniform force on lever 38 during initial operation of the tool. Moreover, because of the variable fulcrum structure described above, the force required to operate the tool throughout the entire stroke will tend to be uniform.

Since pin 64 (secured to frame 96) slides within bore 61 of the wing 58, alignment of cable-advance assembly 92 with the anvil/blades is maintained during operation of the tool. The push rods (or ejector pins) 66, depending from the wing 58, are pressed against the cable 82 and compress the springs 68 during the cable advance operation. Once the slicing/separating operation is complete, the rod 66 urges cable 82 away from the cutters 73-74 as the tool handles are opened. The cable 82 tends to be ejected from the tool 30, thereby avoiding the risk of injury to the operator who would otherwise remove the cable with his fingers near the blades.

It will be appreciated that the hand slots (unnumbered) formed in handles 36 and 38 permit the tool to be operated, at least initially, with one hand. This will facilitate starting either the cable-slicing operation or the wiring device assembly operation (described below) by enabling the operator to position the cable (or the device and cable for assembling the wiring device) in the cable-advance assembly 92 on the tool while closing the tool parts until the cable makes initial engagement with the cutters of anvil 48.

The flanges 50 and 84 which support the anvil assembly 48 and cable-advance assembly 92, respectively, are also seen to have the configuration of a pair of jaws 95 wherein an upper jaw member (further identified by the legend 95A) is formed on the flange 50, while a lower jaw member (further identified by the legend 95B) is formed on the plate 84. In addition to the foregoing function of advancing the cable onto the cutters 73-74 and the tapered support members (60 or 61/60a) for slicing cable 82 and spreading the cable wires 80, the jaws 95 may also serve as a vise for completing assembly of a self-contained (or boxless) type of wiring device such as disclosed in my copending application (entitled "SELF-CONTAINED ELECTRICAL WIRING DEVICE" Ser. No.[130,224], filed Mar. 14, 1980), the disclosure of which is hereby incorporated by reference.

The front face (i.e., the switch mechanism or the receptacle sockets) of the body portion of the device is placed into slot 85. The sliced portion of the cable is placed over the slicing terminal portions of the contacts which are exposed at the back of the body and the back cover is thence placed in proper alignment over the separated conductors at the back of the device. Handle 38 is rotated into handle 36 (as described more fully above) to drive plate 84 towards flange 50 and thereby force the back cover of the device into the body portion. Because of the arrangement of projections on the interior surface of the back cover, the cable conductors 80 are forced into the slots of the content terminal portions to electrically terminate the conductors and contacts.

The ribs 86, in addition to strengthening the plate 84 also help secure the wiring device so that the tool 30 can serve as a vise for closing the wiring device. Thus, the tool 30 serves the two-fold function of slicing the cable and separating its wires 80 and, then, completing assembly of the wiring device by attaching the cable conductors to the terminals of the wiring device. Furthermore, it will be understood that flanges 50 and 84 (with anvil assembly 48 supported on flange 50 and cable advance assembly 92 supported on flange 84) form dual jaw means for slicing the cable sheath and for completing assembly of the wiring device. The jaws, indicated at 95A and 95B, are positioned relative to each other by movement of cylinder 34 relative to cylinder 32.

It is also to be understood that the above-described embodiment of the invention is illustrative only and that modifications thereof may be made without departing from the scope and spirit of the invention. For example, the tool of the present invention can be made as a pneumatic tool by coupling an air cylinder to slide member 34 while member 32 remains stationary. In addition, a spring-loaded ball-and-detent can be incorporated in the tool to provide a defined stop at a desired position in the stroke by mounting a spring-loaded ball at the interior surface of cylinder 32 (as indicated by screw 33) and an annular groove (indicated at 35) or an indentation in the exterior surface of cylinder 34.

It will be appreciated that the tool according to the present invention is sturdy and relatively easy to operate. Because most moving parts are either housed within structurally hard members (e.g., cylinder 32) or surrounded by other sturdy structures (e.g., flanges 50 and 84 or frame 96), it will be found that the tool can withstand inadvertent dropping, etc. without sustaining any damage. In addition, when the tool is not being used and the handles 36 and 38 are in the closed configuration, the cutting blades 73-74 of anvil 92 are safely covered by blocks 99 and 101 and plate 100, thereby preventing inadvertent injury to a person. Moreover, because handle 36 is offset from the central axis of cylinder 32, space is provided between handles 36 and 38 for the operator's hands so his knuckles will not collide when he reaches the end of the cutting stroke.

It will also be understood that any suitable materials may be used for the various parts of tool 30. For example, cylinder/handle/flange 32/36/50, handle 38, crossbar/wings 56/58, flange 84 and frame 96 may all be cast from aluminum. The guide pins such as 64 may be made from high carbon tool steel, and pin 40, the ejector pins 66 and guide bars 104 may be made from drill rod. Center shaft 34 may be made from case-hardened steel and the cutting blades may be made from high-carbon thru-hardened steel. Sliding blocks 99 and 101 may be made from any suitable plastic, e.g., an acetal plastic material such as "DELRIN" made by E. I. du Pont, and the various springs may be made from 302 stainless steel or "music wire".

It will further be appreciated that not only is the cutting edge of cutting blade 74 recessed slightly behind that of blade 73 (about 1/16" to about 3/16" as measured at the apex of each blade), but also the shapes of the cutting edges are slightly different. The angle of the cutting edge made at the the apex of leading blade 73 is slightly steeper (preferably about 123°–125°) than that of blade 74 (preferably about 135°–137°) to facilitate the cutting force required at the initial slicing engagement of blade 73. In addition, a cutting edge is also formed along at least a portion of the side edges of the cutting blades to ensure that the cut in the cable is the desired length.

The blades 73 and 74 are also preferably spaced apart so as to coincide with the spaces between the insulation on the two outer conductors and the un-insulated ground conductor. For the usual 3-wire plastic sheathed "Romex" cable, this spacing may be about $\frac{1}{8}$".

It will also be understood that the cylindrical outer member of bearing 44 may be formed with a square exterior configuration rather than the round configuration shown herein. This will provide more bearing surface over which forces acting on handle 38 may be transmitted to inner cylinder 34. In either embodiment, the length of slot 46 may be about $\frac{1}{2}$"–1".

Accordingly, it is desired that this invention is not to be limited to the embodiment disclosed herein.

What is claimed is:

1. A method of preparing an insulated multi-conductor electrical cable for termination to a self-contained electrical wiring device, comprising the steps of:
    moving the cable onto a pair of cutting blades to slice into the cable insulation, each blade slicing between individual conductors within the cable;
    separating the individual conductors from each other by further advancing the cable onto spreader means in association with said blades to spread apart the sliced cable conductors, said steps of advancing the cable and separating the conductors being carried out generally simultaneously by a single tool member by closing a pair of pivotally connected handle members one of which directly causes advancement of the cable by vehicle fulcrum means adapted to enable application of a generally uniform force to said tool during said advancing and separating steps; and
    supporting each cable conductor during said separating step.

2. A method according to claim 1, which further includes urging the sliced and spread apart cable conductors of the cutting blades by biased ejector members which are compressed during the slicing steps.

3. A method according to claim 1, which further includes the steps of causing one of said cutting blades to slice into the cable insulation before the other.

4. A tool for slicing through the insulating sheath on a multi-conductor electrical cable and spreading apart the cable conductors, comprising:
    an anvil assembly having cutting blade means thereon for slicing the cable sheath and spreader means adapted to spread conductors of the cable after the sheath is sliced;
    a cable advance assembly adapted to locate the cable prior to slicing and to support the conductors in generally the same plane as the cable while the cable sheath is being sliced and the conductors are being separated; and
    tool frame means operatively coupling said cable-advance and anvil assemblies, said tool frame means including a pair of handle members operable in generally scissor-like manner to move said cable-advance assembly towards said anvil assembly when said handle members are urged towards each other, one of said handle members of said tool frame means being operably coupled to said cable-advance assembly by variable fulcrum means adapted to achieve maximum mechanical advantage at a point of closure of said handle members towards each other corresponding to maximum resistance to slicing the cable, such that operation of the tool requires exertion of a generally uniform force during slicing of the sheath and spreading of the conductors.

5. A tool according to claim 4 wherein said cable-advance assembly includes at least two sections slidably mounted for displacement relative to each other along a supporting member, each said slidable section adapted to support an individual cable conductor during the separation operation.

6. A tool according to claim 5 wherein said cable-advance assembly includes spring means for urging said slidable sections towards each other.

7. A tool according to claim 4 where individual cutters of said cutter assembly have cutting edges which are staggered relative to each other for sequentially initiating the separation of individual ones of said cable conductors from each other.

8. A tool according to claim 7, wherein said cutting edges of said cutters are of generally triangular configurations, one cutting edge having a higher altitude than the other to provide said staggered relation.

9. A tool according to claim 4, which further includes a pair of jaw members supported on said tool frame means for moving towards each other when said handle members are urged towards each other, said jaw members being adapted to hold a self-contained wiring device for closing the device after a sliced and separated cable has been placed in the device.

10. A tool according to claim 9, wherein said jaw members extend from an opposite side of said tool frame means from said anvil and cable-advance assemblies to help minimize the danger of injury to an operator of the tool by said cutting blade means.

11. A tool according to claim 4, which further includes guide pin means between said anvil and cable-advance assemblies, said cable-advance assembly slidably engaging said guide pin means which ensure relatively fixed alignment between said anvil and cable-advance assemblies during the slicing and separating operations.

12. A tool according to claim 4 or 11, which further includes ejector pin means carried generally by said anvil assembly for urging a cable outwardly of said cutting blade means after sheath slicing and conductor separation has been completed.

13. A tool according to claim 12, wherein said ejector pin means are further adapted to engage the cable in said cable-advance assembly at least just prior to sheath slicing to help locate the cable for sheath slicing.

14. A tool for slicing through sheathing of a multi-conductor cable and separating individual conductors thereof, comprising:
an anvil assembly having cutting blade means thereon for slicing through the sheathing, and spreader means for separating the individual conductors after the sheathing has been sliced;
a cable-advance assembly adapted to locate the cable relative to the cutting blade means and to support the conductors while being separated; and
operable frame means for supporting said cable-advance and anvil assemblies in spaced apart relation prior to slicing the cable sheath, said frame means including a pair of handle members operable to move said cable-advance assembly towards the cutting blade means of said anvil assembly for slicing the cable and, thereafter spreading the cable conductors apart by said spreader means, said handle members being pivotally connected directly to each other, one of said handle members being coupled to said cable-advance assembly by variable fulcrum bearing means adapted to provide maximum mechanical advantage at about the mid-point of the cutting stroke of the tool, such that a person operating the tool exerts a generally uniform force over the entire cutting and separating stroke.

15. A tool according to claim 14, wherein said cutting blade means includes two slicing blades positioned such that the tip of one slicing blade engages the cable slightly before the other.

16. A tool according to claim 15, wherein the tip of said one slicing blade projects from about 1/16" to about 3/16" beyond the tip of said other slicing blade.

17. A tool according to claim 14, 15 or 16, which further includes a pair of flange members mounted to said frame means, one of said flange members being generally adjacent said anvil assembly and the other of said flange members being generally adjacent said cable-advance assembly, said flange members being displaced towards and away from each other when said handle members are closed and open, respectively, such that said flange members form a vise-like tool for facilitating closure of a self-contained wiring device.

18. A tool according to claim 16, wherein the cutting edge of said cutting blade means generally come to points at their centers, the angle defined at the apex of the cutting edge of said one cutting blade being slightly less than the angle defined at the apex of said other cutting edge.

19. A tool according to claim 14, wherein said cable-advance assembly includes a pair of block members laterally slidable relative to each other, each said block member being adapted to provide a seat for a cable conductor after the cable is sliced and to move with the cable conductor while said cutting blade means separates the individual cable conductors and to receive the cutter blade means of said anvil assembly during the separation operation.

20. A tool according to claim 19, wherein each said block member is formed with a corner-edge of less than about 90° to help direct the sliced cable conductors onto the seats on said block members.

21. A tool according to claim 14 wherein said spreader means includes tapered blade support members on said anvil assembly for supporting said cutting blade members, said support members tapering outwardly away from the edges of said cutting blades for separating the cable conductors, said tapered support members forcing said block members laterally away from each other to spread the cable conductors.

22. A tool according to claim 21, wherein said tapered blade support members include inserts made of a material providing a relatively friction-free tapered surface.

* * * * *

UNITED STATES PATENT AND TRADEMARK OFFICE
CERTIFICATE OF CORRECTION

PATENT NO. : 4,387,746
DATED : June 14, 1983
INVENTOR(S) : James E. Meehan

It is certified that error appears in the above—identified patent and that said Letters Patent is hereby corrected as shown below:

IN THE CLAIMS:

Claim 1, Column 8, Line 15, "vehicle" should read --variable--.

Signed and Sealed this

Nineteenth Day of June 1984

[SEAL]

Attest:

GERALD J. MOSSINGHOFF

*Attesting Officer*    *Commissioner of Patents and Trademarks*